July 22, 1969  C. J. BESKOW  3,456,941
MEANS OF APPLYING THREADOLETS
Filed March 20, 1967
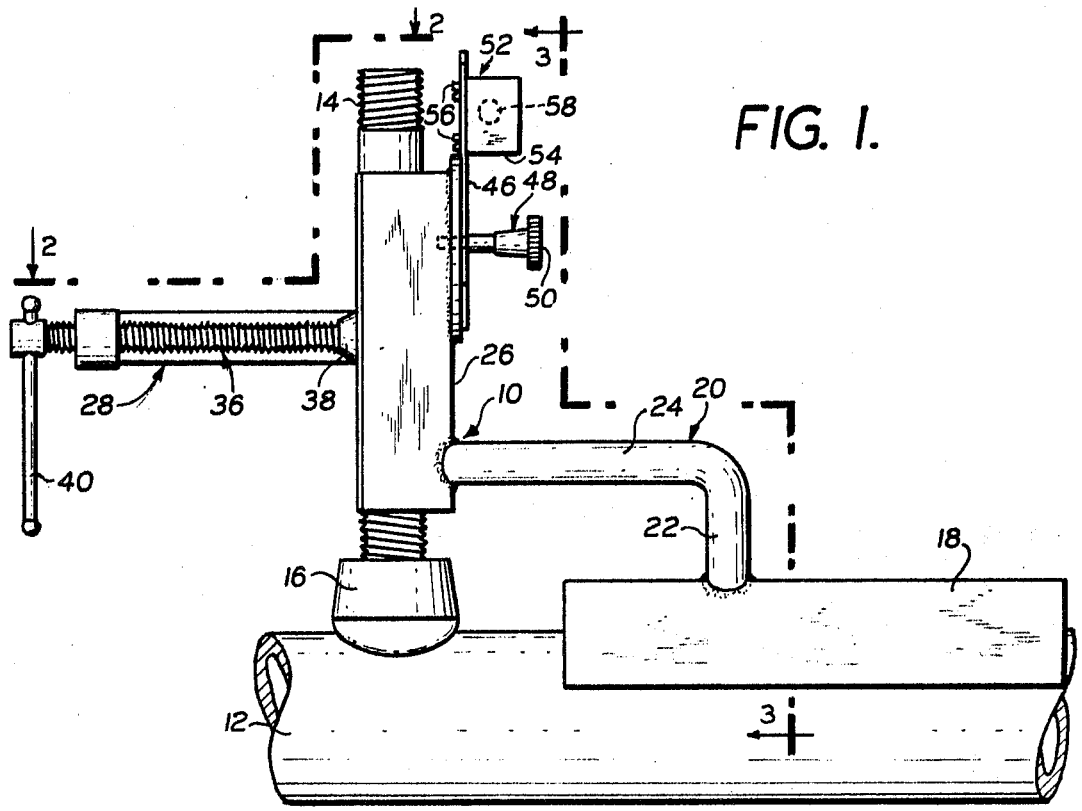
FIG. I.
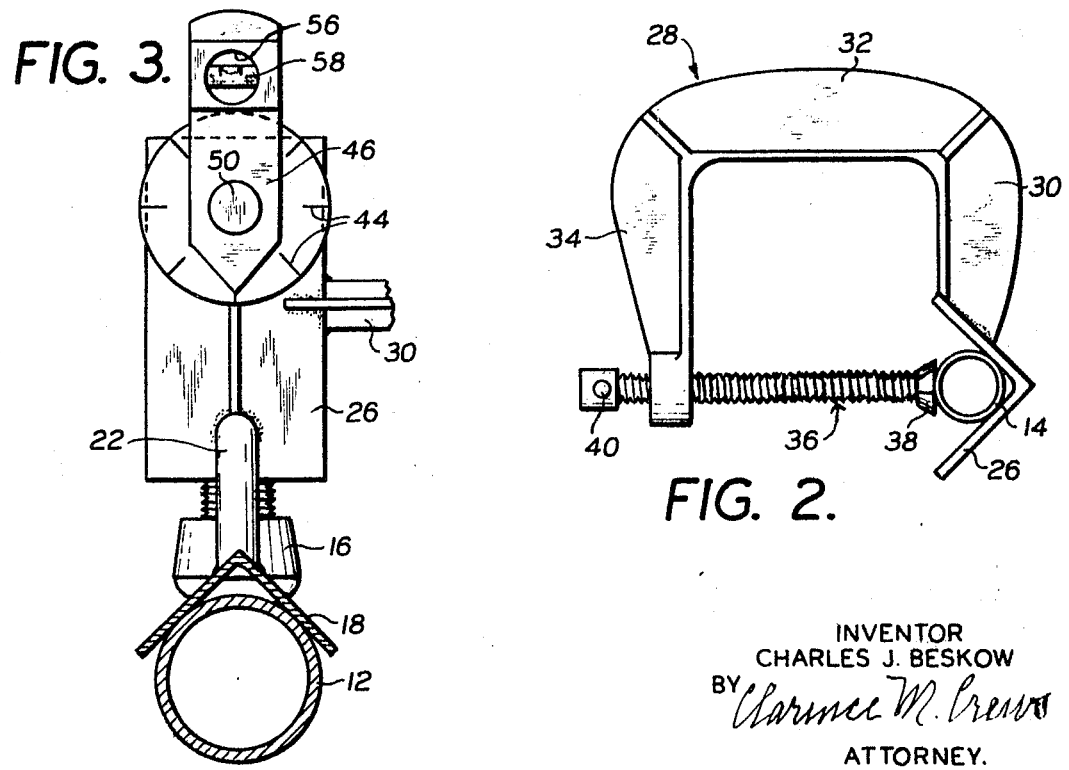
FIG. 3.
FIG. 2.
INVENTOR
CHARLES J. BESKOW
BY
ATTORNEY.

United States Patent Office 3,456,941
Patented July 22, 1969

3,456,941
MEANS OF APPLYING THREADOLETS
Charles J. Beskow, 1035 Murray St.,
Medford, Oreg. 97501
Filed Mar. 20, 1967, Ser. No. 624,281
Int. Cl. B65b *1/04;* B25b *1/20*
U.S. Cl. 269—19                                    4 Claims

ABSTRACT OF THE DISCLOSURE

The invention relates to a novel jig and to the use thereof for mechanically controlling the relation of a threadolet to a fixed pipe, first when marking the pipe preparatory to the cutting of a hole in it, and then when welding the threadolet in place over the hole. The jig facilitates and compels coplanar disposition of the pipe and the threadolet axes, and a perpendicular relationship of such axes. The jig includes an angularly adjustable level, through which orientation of the threadolet relative to the pipe axis may be controlled and nicely adjusted in some circumstances.

---

This invention relates to the installation of pipe systems, and more particularly to the joining of pipes through the use of threadolets. The invention is appilcable to the installation of any pipe system in which threadolets may be advantageously employed including, for example, pipes designed to carry illuminating gas, fuel oil, water, steam or various chemicals—also to serve as electrical conduits, and to perform purely mechanical services.

The threadolet is especially useful as a substitute for the T fitting. When a T fitting is installed, two lengths of pipe have to be measured, cut, and then threaded at the cut ends, before they can be joined to the T, and three threaded joints must be produced, one for each of the three arms of the T, any of which joints may be leaky unless it is tightened to the optimum degree. The securement of a tight joint between the first installed pipe and the T fitting may be inconsistent with the desired orientation of the fitting, that is to say, with the desired direction of the branch pipe. A large and varied stock of T fittings must be kept on hand to cover all of the combinations of input and output diameters which may possibly be required, including both reducing and non-reducing combinations.

When a threadolet is used, a fixed or installed pipe, generally usefully pre-threaded at both its ends, and of standard length, is first marked to the outline of the threadolet at an appropriate point, and the operator, guided by the marking, cuts a suitable opening through the pipe wall by the use of an oxyacetylene torch. A threadolet is then welded in place over the opening, and a single branch pipe is threaded tightly into the threadolet.

The threadolet has steadily gained in popularity since its introduction, and it has, to a considerable extent, supplanted the use of T fittings, especially in the larger sizes. The techniques presently employed in connection with the use of threadolets are not, however, free from faults and difficulties. They fall far short of exploiting these devices to the best possible advantage.

If, for example, a vertical branch is to be provided upon on installed, horizontally disposed pipe, a threadolet having a long nipple screwed loosely into it is placed at a desired location upon the installed pipe, in a position judged by eye to be such that the axis of the nipple extends in the vertical plane which includes the axis of the installed pipe, and exactly at right angles to the axis of the installed pipe. With the nipple held in one hand, the outline of the threadolet is marked on the installed pipe and the nipple and threadolet are set aside while the desired opening is torch cut in the marked area.

The nipple and threadolet combination is now replaced in what is judged by eye to be the same position and the same attitude as before. Wearing a welding hood, which tends to obstruct the view, and with the possibility that the nipple holding hand may wobble or bodily move the threadolet, or that the operator's judgment as to placement may have been faulty in one or both instances, the operator proceeds, through electric arc welding, to effect two or more tack welds. He then checks the placement of the threadolet and nipple, and attempts to improve it if necessary.

He may find that the threadolet has been placed off center relative to the prepared hole to such a degree that the tacks have to be cut away by the torch and a fresh start made. He may find that the nipple is located in the vertical plane which contains the axis of the installed pipe, but is canted relative to the axis of the installed pipe. He may find that the nipple extends at right angles to the axis of the installed pipe but is disoriented so that it does not extend vertically as desired. He may find a combination of two or more of these faults.

Inspection and correction consume time and may require reheating by the torch of the applied tacks and pounding of the nipple. Only after the position has been inspected, and adjusted if necessary, can the weld be continuously and finally effected around the base of the threadolet. Even then it may turn out when the nipple has been removed and replaced in the threadolet by a pipe of useful length, that the pipe is intolerably misdirected. Even more serious problems arise when the branch pipe, intended to be so oriented that it will slope up or down at a predetermined inclination, say forty-five degrees, is judged solely by eye.

It is the primary object of the present invention to obviate difficulties of the kind referred to above through the provision and employment of a threadolet holding jig, by which the threadolet may be precisely located in the correct position on the installed pipe for marking the outline of the opening to be cut, and may be dependably and precisely returned to, and stably maintained in, the same position until the weld has proceeded far enough to warrant the putting aside of the jig. It has been clearly established that the quality of the work is greatly improved and the rate of output more than doubled by the use of the jig and the resulting simplified procedures, as compared with the best available prior practice.

It is a further object to provide the jig with an angularly adjustable level and an associated dial, whereby the orientation of the jig relative to an installed horizontal pipe may be quickly and accurately established for pipe marking and quickly and dependably reestablished for welding.

It is an important feature of the invention that the jig, in its preferred form, is adapted for use with any one of the usual diameters of installed pipe in conjunction with any one of the usual diameters of branch pipe, with no other adjustment required than the tightening of a clamp, which forms part of the jig, onto a threadolet-connected nipple of appropriate diameter.

Other objects and advantages will hereinafter appear.

In the drawing which forms part of this specification
FIGURE 1 is a view in elevation showing a practical and advantageous, illustrative jig embodying features of the invention, in association with an installed pipe and with a threadolet and a threadolet-connected nipple;

FIGURE 2 is a plan view of a portion of the structure of FIGURE 1, as indicated by the broken line 2—2 of FIGURE 1; and FIGURE 3 is a vertical sectional view taken on the line 3—3 of FIGURE 1, looking in the direction of the arrows.

For simplicity, the illustrative jig will be first described by reference to the position which it occupies in FIGURE 1, it being understood, of course, that it can be used in, and will frequently occupy, other attitudes than that in which it is shown.

In FIGURE 1, a jig 10 is shown in association with an installed, horizontal pipe 12 and a vertically extending nipple 14, the nipple having a threadolet 16 threaded onto its lower end. The jig includes a short angle bar 18 which bears downward against the pipe 12 and follows a course which extends lengthwise of the pipe. When the angle bar 18 is placed with both its lower faces in continuous engagement with elements of the cylindrical pipe 12, the plane which bisects the dihedral angle of the angle bar 18 necessarily includes the axis of the pipe 12, regardless of the orientation of the angle bar relative to the pipe, and the line of intersection of the angle bar faces necessarily extends parallel to the axis of the pipe. As shown, the angle bisecting plane is a vertical plane.

A rod or connector 20 has a vertical arm 22 which is fixedly connected, as by welding, to the back or upper surface of the angle bar 18, and it also has a horizontal arm 24 which is fixedly connected at its left end, as by welding, to the back or right hand surface of a second angle bar 26. The course of angle bar 26 extends precisely at right angles to the course of angle bar 18, and its angle bisecting plane coincides with the angle bisecting plane of the angle bar 18. The angle bars 18 and 26 are connected to back to back relation with a sufficient spacing between their proximate ends to accommodate threadolets of a very wide range of sizes between them.

A C-clamp 28, of which the angle bar 26 forms one jaw, is provided for holding the nipple 14 in firm and continuous engagement with the angularly related faces of the angle bar 26. The C-clamp 28 comprises a first arm 30 which is made unitary, as by welding, with the angle bar 26, a body part 32 which extends leftward from the arm 30, and a terminal arm 34 which is disposed opposite the arm 30 and extends parallel to the latter. A continuously threaded, low pitch screw 36, having a head 38 at its right hand end, is screwed through the arm 34 and extends directly toward the line of intersection of the two faces of the angle bar 26.

The screw serves as a pressure applying member. An operating rod 40, headed at both ends, slides freely through the left end of the screw 36. The screw may, if desired, be retracted leftward until the head 38 engages the arm 34 of the C-clamp, so that a wide entrance opening to the C-clamp is provided for accepting nipples of large diameter, and thus contributes to the accommodation of correspondingly large threadolets.

The angle bars 18 and 26, if extended, would meet at right angles, but each is terminated a substantial distance short of meeting-relation to provide space for the threadolet. The threadolet would always be of substantially the shape shown, regardless of its size, and hence the height would be increased substantially in proportion to its diameter. It should be noted that since the pipe 12 would be a main conduit and the nipple 14 corresponds in diameter to a branch conduit, the diameter of the pipe 12 would almost always be equal to, or greater than, the diameter of the nipple 14. As the diameter of the pipe 12 is increased, the pipe engages the walls of the angle bar 18 progressively farther down from the intersection of the faces of the angle bar 18, thus providing more space heightwise for the threadolet.

It is important that the axis of the nipple 14 be located precisely in a plane which includes the axis of the pipe 12. This is assured by the fact that the bisecting planes of the angle bars 18 and 26 coincide.

It is also important that the orientation of the nipple and the connected threadolet relative to the axis of the pipe 12 can be precisely set for marking, and precisely reproduced and maintained for welding, both for the vertical orientation of the nipple 14 and for other selected orientations. The illustrative jig includes provision for assuring this result.

The angle bar 26 has affixed to its back boundary, as by welding, a circular dial plate 42, whose face is disposed exactly at right angles to the angle bisector plane of the angle bars 18 and 26. The face of the dial plate 42 is provided with graduation marks 44, indicating the vertical, the horizontal, and slopes of forty five degrees above and below horizontal to the left and to the right. Additional marks may be provided if desired.

A pointer plate 46 is alternatively supported for pivotal movement, and clamped in place, at the center of the dial plate by a shouldered clamping screw 48, which screw is provided with a knurled head 50 of substantial diameter for easy manual operation. The pointer 46 is shown as clamped in vertical position.

The pointer 46 protrudes beyond the circumference of the dial plate and has a small spirit level 52 affixed to its protruding end. The level 52 comprises a metallic block 54 which is secured to the pointer plate 46 by screws 55. The block 54 is formed with a circular opening 56 which extends completely through it, and the familiar spirits-filled glass tube 58 extends across the opening with suitable markings provided to indicate the central position of the usual air bubble. The pointer plate 46 is provided with a circular, light transmitting opening in coincidence with the opening 56 of the block 54, to facilitate the reading of the level.

If it is desired to have a branch pipe take off vertically from an installed horizontal pipe, the pointer 46 is set to point vertically downward as shown in FIGURE 3. A nipple 14, having a threadolet 16 threaded on it, is then lightly but firmly clamped in the angle bar 26. The angle bar 18 is placed and held firmly and evenly on the pipe 12 while the nipple and threadolet are readjusted to cause the threadolet to bear on the pipe 12. The nipple is then firmly clamped. The operator then turns the jig about the axis of pipe 12 until the bubble indicates that the level is in a horizontal position. Now, with the angle bar 18 held firmly to the pipe with one hand, the operator marks the outline of the threadolet on the pipe 12, using the other hand. The jig is then removed from the work for hole cutting.

After hole cutting, the jig is put back in precisely the same position as before by the same procedure, save that no readjustment of the pointer or the nipple is required. The angle bar 18 is held firmly and steadily to the pipe 12 with one hand, while the electric arc welding rod is manipulated with the other. No preliminary tacks are necessary; no interruption for inspection of position and readjustment is required; and the welding is proceeded with directly and expeditiously. When the welding operation has progressed far enough to assure fixity of position of the threadolet, the welding is interrupted while the clamp is backed off a few turns to release the nipple, and the jig is withdrawn and put aside. The weld is then completed.

Finally, the nipple is replaced in the threadolet by a pipe of desired length which has the same diameter as the nipple. The added pipe is screwed securely home, and the nipple connected to another threadolet.

If an installed pipe is a vertical pipe and the branch pipe is to extend horizontally, the level is of no help in determining the correct orientation of the branch pipe relative to the axis of the installed pipe. In this instance, however, the angle bar 26 can be clamped onto the vertically installed pipe with the trough of the bar 18 facing upwardly. With a light rod of considerable length held firmly in the trough of angle bar 18, the clamp can be relieved sufficiently to permit the jig to be rotated about the vertical axis of the installed pipe, and to be adjusted up and down. When the desired adjustments have been made, the clamp is tightened, the rod is discarded and the threadolet carrying nipple is placed and firmly held by the hand in the angle bar 18, first for marking and then for welding.

As previously noted, the improved procedure described above and made possible by the novel jig, doubles the production output of a workman. Not only is this true, but the work which is accomplished at double the previous rate is of much higher quality than that performed by the older method.

I have described what I believe to be the best embodiments of my invention. I do not wish, however, to be confined to the embodiment shown, but what I desire to cover by Letters Patent is set forth in the appended claims.

I claim:
1. A jig for use in the welding of threadolets to fixed pipes and capable of mechanically assuring that the threadolet axis will be disposed in coplanar relation to the pipe axis and at right angles thereto, said jig comprising:
   (a) a first angle bar;
   (b) a second angle bar disposed at right angles to the first and in coplanar, back to back relation thereto, the proximate ends of the angle bars being each terminated a substantial distance short of intersecting relation with the course of the other angle bar, so that a substantial space is provided between such proximate ends for the accommodation of threadolets of various sizes;
   (c) a rigid connector rigidly affixed to the backs of the angle bars and spaced well back from the proximate ends of the angle bars, while leaving a distal end of the first angle bar of substantial length clear for a handhold through which the jig may be clamped by hand to the fixed pipe during marking of the fixed pipe and again during welding;
   (d) clamping means affixed to, and cooperative with, the second angle bar, and including a pressure applying member operable toward and from the face of the second angle bar to secure and maintain a pipe or a threadolet-connected nipple in a selected position lengthwise of the second angle bar, and in continuous line contact with the angularly related faces of the second angle bar.

2. A jig as set forth in claim 1 in which the clamping means includes a rigid, C-shaped frame having a first arm affixed to the second angle bar, and a second arm located opposite the face of the second angle bar and spaced widely therefrom, and the pressure applying member of the clamping means comprises a low-pitched screw, threaded through said second arm and directed along the angle bisecting plane of the second angle bar and directly toward the line of intersection of the faces of said second angle bar.

3. A jig as set forth in claim 1 which further includes:
   (e) a dial plate fixed on the back of the second angle bar in a plane at right angles to the line of intersection of the faces of the first angle bar;
   (f) a pointer cooperative with the dial plate;
   (g) a clamping screw passed through the pointer and threaded into the dial plate, and forming alternatively a pivot and a clamp for the pointer; and
   (h) a level carried on the pointer in a plane parallel to the face of the dial plate and in fixed relation to the pointer, and settable by and with the pointer at various definite angles to the course of the second angle bar.

4. A jig as set forth in claim 3 in which one end of the pointer protrudes beyond the dial plate, the level is mounted on the protruding end of the pointer, the level has an opening through its body and a spirits-containing tube extending across said opening, and the pointer has a light transmitting opening of substantial size in line with the opening in the level body for facilitating the observation and reading of the level.

References Cited

UNITED STATES PATENTS 2,387,154  10/1945  Kalwitz _____ 269—41
3,211,446  10/1965  Headrick _____ 269—321

LESTER M. SWINGLE, Primary Examiner

U.S. Cl. X.R.

29—475; 269—41